July 9, 1935.    A. E. WESTBURGH    2,007,513
FLEXIBLE COUPLING
Filed Dec. 22, 1933
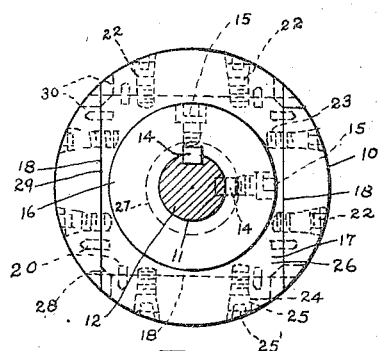
Fig 1
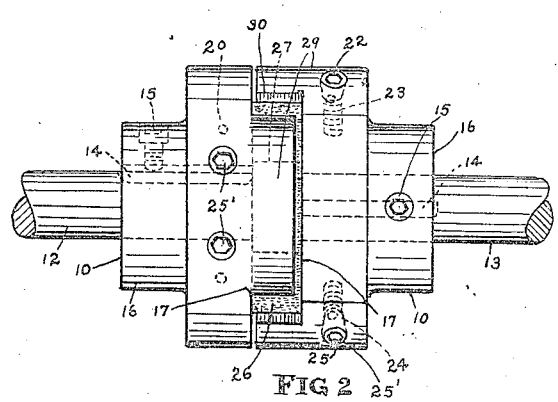
Fig 2
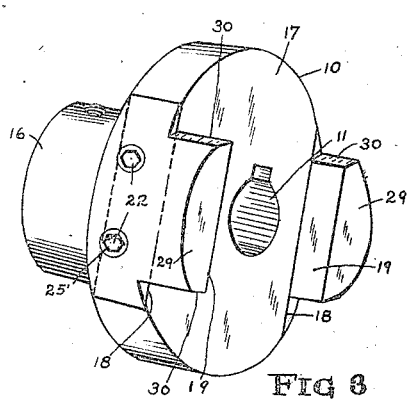
Fig 3
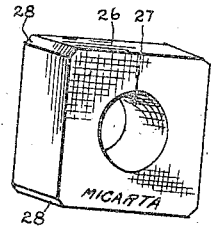
Fig 4
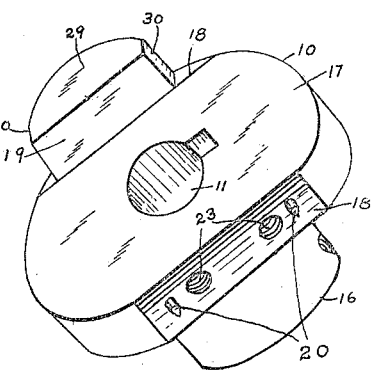
Fig 5
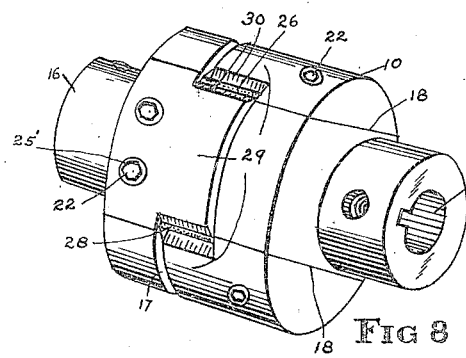
Fig 8
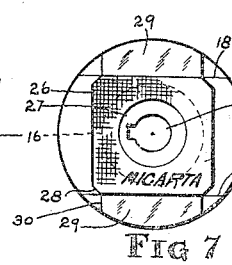
Fig 7
Fig 6
Inventor,
ARTHUR E. WESTBURGH
By
His Attorney Patented July 9, 1935

2,007,513

UNITED STATES PATENT OFFICE 2,007,513

FLEXIBLE COUPLING

Arthur E. Westburgh, Jamestown, N. Y.

Application December 22, 1933, Serial No. 703,632

10 Claims. (Cl. 64—96)

This invention relates to a flexible shaft coupling and aims to provide a novel and improved construction, wherein the main wear due to centrifugal driving force from one coupled shaft to the other, occurs at relatively inexpensive and replaceable coupling jaws or lugs, in coaction with a block.

An important object is to provide a construction wherein the coupling sections always remain fixed on the shaft after being once positioned and attached, do not require removal or replacement as the usual plate surface wear thereon is overcome, enabling the shafts to always remain in perfect alignment or set, which is undisturbed during inspection or replacement of the parts subject to wear.

A further object is to provide a coupling having a block snugly fitted with the jaws or lugs preventing metal to metal contact of any of the parts, and which block is removable and replaceable without disturbing the connection of the coupling sections, and a block for general coupling use desirably formed of a phenolic condensation product, preferably Micarta, as I have found that its use does not require lubrication and effects a silent connection, thus apparently having the inherent quality of being self-lubricating.

Additional objects and advantages will become apparent from a consideration of the description following taken in connection with accompanying drawing illustrating an operative embodiment.

In said drawing:

Fig. 1 is a left end view of the coupling in use;

Fig. 2 is a side elevation of the parts of Fig. 1;

Fig. 3 is a perspective view of a coupling section and attached jaws;

Fig. 4 is a perspective view of the Micarta block;

Fig. 5 is a perspective view of one of the shaft coupling sections having but one jaw in place;

Fig. 6 is a detail perspective view of one of the jaws;

Fig. 7 is an elevation looking toward an inner face of one coupling with the block attached, and Fig. 8 is a perspective view of a complete coupling.

Referring specifically to the drawing wherein like reference characters designate like or corresponding parts, the coupling primarily consists of two identical metallic sections 10 having bores 11 extending completely therethrough, one adapted to receive a conventional driving shaft 12 and the other adapted to receive a conventional driven shaft 13, the coupling sections being rigidly secured to their respective shafts in any suitable manner as by means of keys 14 engaging grooves of the sections and shafts. Headless screws 15 are also countersunk in collars 16 of the said sections 10 and bind against the keys 14.

Integral with said collars 16 are plates 17 having parallel sides 18 detachably engaged by jaws 19 whose inner surfaces are planular. Said jaws and surfaces have interfitting pins and recesses at 20 and 21 which aid in initially positioning and holding the jaws in place. Said jaws are primarily rigidly and accurately secured in place by means of headless screws 22 having threaded engagement in openings 23 at said surfaces 18 of the plates, the screws 22 also having tapered portions 24 passing through tapered holes 25 of the jaws, the taper causing the screws to accurately draw and position the jaws with respect to said sides or faces 18. Wrench-engaging sockets 25' are provided in portions 24.

A substantially rectangular coupling block 26 is used, which has a central bore 27 larger in diameter than the bores 11, into which the adjacent ends of shafts 12 and 13 may extend, if desired. The corners of said block are chamfered or cut away at 28. This block is of greater thickness than the depth of the lugs or free portions 29 of the jaws, so that the lugs cannot touch the adjacent plates as best seen in Fig. 2. The block has a snug, pressed fit between the lugs 29, intimately abutted by all four lugs at their sides 18. The ends of the lugs 29 are also cut away or chamfered as at 30 so that the lugs will be held apart and will not touch with consequent wear, because of the snug engagement of the lugs with the block under normal conditions.

This coupling block 26 is made from a phenolic condensation product or bakelite, having a textile fiber base, and for instance, the specific material sold under the name of Micarta. I find that this material in effect renders the coupling self-lubricating, that is, the block and the coupling sections do not require lubrication, and the operation is substantially silent.

Because of the construction described, the wear primarily occurs on the faces or sides 19 at the lugs. The removability of the lugs enables their replacement when necessary in order to maintain the coupling efficient, without requiring the purchase of a new one or replacing a complete section or shaft-attached part. Such jaws are made of hardened metal which best withstands wear, and since the plates and collars are subject to but normal and minimum wear, the plates and collars may be made of even softer and less expensive metal than the jaws.

The coupling particularly enables inspection, repair and substitution of the block and any or all jaws without detaching the coupling sections from the shafts, which is greatly advantageous as regards maintaining the shafts and coupling sections aligned, the saving of time and manipulation of parts where the space of installation is restricted.

Various changes may be resorted to within the spirit and scope of the invention.

I claim as my invention:—

1. In combination with a driving shaft and a driven shaft, a coupling section on each shaft, a coupling block between said sections, and removable jaw means on said sections overlapping said block at the margin of the latter, enabling removal of the block in a radial direction while said coupling sections are in normal position.

2. In combination with a driving shaft and a driven shaft, a coupling section on each shaft having a plate, a coupling block between said plates, said plates having flat side walls, jaws overlapping and detachably secured to said walls alternately extending beyond the inner faces of the respective plates and overlapping said block.

3. The combination of claim 1 wherein said block is of greater thickness than the portions of the jaws overlapping them.

4. The combination of claim 1 having pin and slot connections between said sections and jaws.

5. The combination of claim 1 wherein said block is made from a phenolic condensation product.

6. The combination of claim 1 having pin and slot connections between said sections and jaws, and screws having tapered portions fitting tapered holes in the jaws and threaded to said sections.

7. In combination with a driving shaft and a driven shaft, a coupling section on each shaft comprising a plate having two parallel side faces, a block between and engaged by the adjacent faces of the plates, jaws, means detachably securing the jaws against said side faces and alternately on the respective sections, and lugs on the jaws out of contact with each other overlapping said block and having their free ends spaced from the adjacent plate.

8. In combination with a driving shaft and a driven shaft, a coupling section on each shaft comprising a plate having two parallel side faces, a block of a phenolic condensation product between and engaged by the adjacent faces of the plates, jaws engaging said side faces, pin and slot connections between the jaws and said side faces, screws having tapered portions engaging tapered holes in the jaws and threaded to said faces, lugs on said jaws out of end to end contact and extending alternately from the plates in overlapping relation to the margin of said block, said lugs extending from the plates a less distance than the thickness of the block.

9. The combination of claim 8 wherein said block has a bore into which the shaft ends may extend.

10. The combination according to claim 2 wherein said jaws are of harder metal than said plates.

ARTHUR E. WESTBURGH.